Patented Jan. 17, 1939

2,143,990

UNITED STATES PATENT OFFICE 2,143,990

WELL TREATMENT METHOD

Albert G. Loomis, Mount Lebanon Township, Allegheny County, Pa., assignor to Gulf Research & Development Company, Pittsburgh, Pa., a corporation of Delaware No Drawing. Application November 27, 1934, Serial No. 755,059

10 Claims. (Cl. 166—21)

This invention relates to well treatment methods; and it comprises a method of differentially shutting off water in oil wells having water and oil bearing formations adjacent the bore, wherein two aqueous solutions containing reagents adapted to react to form a water-insoluble, oil-soluble plastic are forced consecutively into the well and adjoining formations, any water standing in the well being removed before injection of the second solution, the plastic remaining as a deposit in the water bearing formation; all as more fully hereinafter set forth and as claimed.

Oil wells often penetrate water-bearing formations as well as oil-bearing formations and the water-bearing formations often deliver water into the well at horizons adjacent to the oil producing strata or sands. This has made it necessary to produce water as well as oil from the well.

Usually no difficulty is experienced in shutting off bottom water. In this case, cement is used and this plug is then drilled out into the oil sand but not to the water sand. However, methods now in use for shutting off water in sands above the oil sand leave much to be desired in the way of efficiency and effectiveness.

According to the present invention, I provide a method for shutting off water flows from water-bearing formations penetrated by a well bore while not permanently affecting the oil flow. I do this with the aid of two aqueous solutions which are capable of reacting to form a water-insoluble, oil-soluble plastic deposit. One of the solutions is forced down the well, after the preliminary removal of water standing in the well, and is forced into the formations adjacent the well as far as possible. The well is then flushed out with water, under sufficient pressure to counteract flow of oil or water into the well, and the other solution is injected into the same formations so as to come into contact with the first injected solution. The two solutions react, and thereby a water-insoluble, oil-soluble plastic substance is deposited in the water formation and, to a less degree, in the oil formation; the incompatibility of aqueous solutions and oil preventing the aqueous solution from penetrating as far into the oil sands as into the water sands. Pressure is released and the well allowed to produce, whereupon any of the substance which may have deposited in the oil formation is dissolved out by the oil and the deposit is left in the water formation, sealing the interstices thereof.

Examples of reagents suitable for my purposes are an aqueous solution of a salt of a fatty acid, such as sodium stearate or an ammonium salt of hydrogenated fish oil, for example, and a corresponding amount of an aqueous solution of an acid, such as HCl or acetic acid, which reacts with the first solution to give a water-insoluble plastic deposit, soluble in oil. All the sodium, potassium and ammonium soaps containing fatty acid, on acidification give a free fatty acid soluble in oil. The rosin in commercial rosin soap, although not strictly a fatty acid, forms an efficient plugging means for the present purposes; rosin soap being used in conjunction with a suitable acid. In some cases, as with commercial sodium oleate soap, the free fatty acid liberated is an oil and acidification may give a liquid product not plugging pores. However, in practically all cases, the deposit is a plastic, more or less hydrated material, plugging wet pores effectively but removable by oil. The further within the formation production of the plastic solid occurs, the less is the differential water pressure tending to force it forward. For this reason, it is advantageous to operate under considerable pressure.

The order may be reversed; the acid being forced into the formation first and the soap second.

In a specific example of the invention applied to the treatment of a well having closely-adjacent oil and water bearing sands, two batches of solutions are made up; one comprising a solution in the proportion of 1 pound of sodium stearate or other commercial soap in 100 pounds of water, the other batch comprising a corresponding amount of a 1 per cent solution of HCl. It is advantageous to use a suitable corrosion inhibitor in the solution of HCl. The sodium stearate solution is pumped into the well and surrounding formations under heavy pressure, until the pumping pressure reaches a high value, thereby securing fargoing penetration. The well is now flushed out with fresh water by usual methods, using sufficient pressure to prevent flow of oil or water from the producing strata into the well. The HCl solution is now introduced under high pressure. It penetrates the formations and reacts with the sodium stearate therein to form a plastic deposit of stearic acid in the water sands and, to a less extent, in the oil sands. Pressure is released and the well allowed to flow. The oil dissolves any stearic acid deposited in the oil sands and flushes it into the well, while the stearic acid remains in the water sands, effectively plugging them. The flow of water into the well is materially reduced.

In another specific example of the invention applied to shutting off water in a well having contiguous oil and water sands, a 1 per cent solution of acetic acid is forced into the well and surrounding formations under high pressure, the well is flushed, and a 2 per cent solution of the ammonium salt of hydrogenated fish oil in water is injected under high pressure. After a while, pressure is released. Oil appears in increasing quantities as it dissolves out the ammonium soap deposited in the oil sands, while the water flow is substantially shut off.

In the methods under the present invention, the acid used in breaking up the soap should be one which is strongly ionized in water. This is the case with most of the common acids including hydrochloric and acetic acids. Acetic acid is, however, a less aggressive acid than hydrochloric.

What I claim is:

1. A method of differentially shutting off water in oil wells penetrating both oil and water producing formations without permanently hindering flow of oil into the well wherein two aqueous solutions, the first containing an acid and the second containing a reagent adapted upon admixture with the acid to react to form a water-insoluble oil soluble plastic are forced consecutively into the well and into the same adjoining formations and are caused to intermingle therein, producing said plastic in place in the interior of the water formation.

2. A method of differentially shutting off water in oil wells penetrating both oil and water producing formations without permanently hindering flow of oil into the well wherein two aqueous solutions, the first containing an acid and the second containing a reagent adapted upon admixture with the acid to react to form a water-insoluble oil-soluble plastic are forced consecutively into the well and into the same adjoining formations and are caused to intermingle therein, forming the plastic in the water formations, the well being flushed with water under pressure before injection of the second solution.

3. The matter of claim 1 wherein the second solution contains a salt of a fatty acid.

4. The matter of claim 1 wherein the second solution contains a salt of a fatty acid and the first solution a strongly ionized acid.

5. The matter of claim 1 wherein the second solution contains a salt of a fatty acid and the first solution an inorganic acid.

6. The matter of claim 1 wherein the second solution contains a salt of a fatty acid and the first solution a strongly ionized organic acid.

7. The matter of claim 1 wherein the second solution contains a salt of a fatty acid and the first solution contains HCl.

8. The matter of claim 1 wherein the second solution contains a salt of a fatty acid and the first solution contains acetic acid.

9. The matter of claim 1 wherein the second solution contains sodium stearate and the first solution contains a strongly ionized acid.

10. A method of shutting off water in porous formations adjacent oil wells, which comprises successively injecting into the same formations two aqueous solutions, one containing acetic acid and the other containing a reagent of the character of soaps adapted upon admixture with acetic acid to react to form a water insoluble oil soluble plastic, and causing the two solutions to intermingle so as to produce said plastic in the interior of the formations.

ALBERT G. LOOMIS.